United States Patent
Balogh et al.

(10) Patent No.: US 11,260,805 B2
(45) Date of Patent: Mar. 1, 2022

(54) APPARATUS AND METHOD FOR MONITORING A VEHICLE CAMERA SYSTEM

(71) Applicant: Knorr-Bremse Systeme Fuer Nutzfahrzeuge GmbH, Munich (DE)

(72) Inventors: Levente Balogh, Szigetszentmiklós (HU); Huba Nemeth, Budapest (HU); Viktor Tihanyi, Budapest (HU); Adam Szoellosi, Budapest (HU); Csaba Opoczki, Erd (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/966,624

(22) PCT Filed: Jan. 31, 2019

(86) PCT No.: PCT/EP2019/052384
§ 371 (c)(1),
(2) Date: Jul. 31, 2020

(87) PCT Pub. No.: WO2019/166178
PCT Pub. Date: Sep. 6, 2019

(65) Prior Publication Data
US 2021/0031705 A1    Feb. 4, 2021

(30) Foreign Application Priority Data

Mar. 1, 2018 (EP) ..................... 18159439

(51) Int. Cl.
*B60R 11/04* (2006.01)
*B60R 11/02* (2006.01)

(52) U.S. Cl.
CPC .......... *B60R 11/04* (2013.01); *B60R 11/0229* (2013.01); *B60R 2300/202* (2013.01); *B60R 2300/408* (2013.01); *B60R 2300/8026* (2013.01)

(58) Field of Classification Search
CPC ................. B60R 11/04; B60R 11/0229; B60R 2300/202; B60R 2300/408; B60R 2300/8026
See application file for complete search history.

(56) References Cited

U.S. PATENT DOCUMENTS

| 10,785,435 B2 * | 9/2020 | Kawazu ................. H04N 5/374 |
| 2009/0009308 A1 * | 1/2009 | Date ....................... B60R 1/00 340/439 |

(Continued)

FOREIGN PATENT DOCUMENTS

| DE | 202013101083 U1 | 7/2013 |
| EP | 1462820 A1 | 9/2004 |

(Continued)

OTHER PUBLICATIONS

International Search Report in connection with PCT/EP2019/052384, dated Aug. 3, 2019.

*Primary Examiner* — James M Pontius
(74) *Attorney, Agent, or Firm* — Norton Rose Fulbright US LLP; Gerard Messina

(57) ABSTRACT

An apparatus for monitoring a vehicle camera system. The vehicle camera system includes at least one camera to capture images of a field of view at a side of the vehicle and a display unit for visualizing the captured images to a driver of the vehicle. The apparatus includes a control unit adapted to control the display unit to display a graphical indicator, the displayed graphical indicator changes sequentially in a default way to allow the driver to visually detect a malfunc- (Continued)

tioning of the vehicle camera system based on a deviation from the default way of the sequentially changing graphical indicator.

13 Claims, 7 Drawing Sheets

(56) References Cited

U.S. PATENT DOCUMENTS

| | | | |
|---|---|---|---|
| 2009/0066793 A1* | 3/2009 | Takeda | H04N 17/002 |
| | | | 348/148 |
| 2009/0102858 A1 | 4/2009 | Eggers et al. | |
| 2017/0174261 A1 | 6/2017 | Micks et al. | |
| 2017/0315771 A1 | 11/2017 | Kerr | |

FOREIGN PATENT DOCUMENTS

| | | |
|---|---|---|
| EP | 3139340 A1 | 3/2017 |
| JP | 2007251555 A | 9/2007 |
| JP | 2016134657 A | 7/2016 |

* cited by examiner

APPARATUS AND METHOD FOR MONITORING A VEHICLE CAMERA SYSTEM

FIELD OF THE INVENTION

The present invention relates to an apparatus and a method for monitoring a vehicle camera system and to a camera monitor system and, in particular, to a failure detection method for such camera monitor systems.

BACKGROUND INFORMATION

It becomes more and more common to replace mirrors of vehicles by camera systems allowing to view a side of the vehicle under adjustable angles with a high resolution. This transition is made possible in particular due to the high vision quality of camera systems and is fueled by providing additional functionalities enabling the driver to inspect areas around the vehicle which are of interest. For example, in contrast to the traditionally used mirrors, the camera display systems allow implementing additional functionalities like zooming or overlay or the reduction of the mirrors air drag.

FIG. 7 depicts an example of a conventional vehicle camera system including a camera 50, a display 70 and a processing unit 80. The camera 50 is mounted at the vehicle 40 at a position to cover with its camera field of view 60 an area of interest (e.g. a side of the vehicle 40). The processing unit 80 is configured to process the captured images of the camera 50 and to control the display 70 to depict subsequent images of the captured side of the vehicle 40 to visualize the environment of the vehicle 40 for the driver.

Examples for vehicle camera systems are, for example, discussed in US 2017/0174261 A1 which concerns a detection method for a turn signal of other vehicles to determine a possible lane change intention of those vehicles. Patent document EP 3 139 340 A1 discusses another camera display system indicating objects detected based on an altering of the contrast of the relevant image part. Patent document US 2009/0102858 A1 discusses a camera-based vehicle display system, wherein the area of interest is highlighted by virtual spotlights by brightening the area of the images shown.

Such camera systems provide many advantages over the traditionally used mirrors and enable novel features. While the conventional mirrors can be broken or the surface can be contaminated, the newly used camera display systems are less prone to severe weather conditions. However, it is important for such camera systems to ensure a correct operation. Unfortunately, a single malfunctioning component may disable the whole system. For example, if the processing unit 80 exhibits an error or any kind of malfunctioning, the display 70 may depict a frozen image of the camera field of view 60. In case the vehicle 40 is at a standstill, the driver cannot estimate whether this is a consequence of the standstill or whether the camera system is malfunctioning. Same applies to surveillance or monitoring systems which allow to obtain a visual view in particular for areas which are outside the field of view of the driver and for which no mirror systems are available. Moreover, in case the vehicle moves at a high speed the driver may experience difficulties to judge a malfunctioning within a short period of time where the driver inspects the display.

Therefore, there is a demand for a system that allows the driver to easily recognize a malfunctioning of a camera system within a short period of time.

FIELD OF THE INVENTION

At least some of the problems described before may be overcome by an apparatus as described herein, a system as described herein, or a method according to the description herein. The further descriptions herein refer to further advantageous realizations of the subject matters of the embodiments described herein.

The present invention relates to an apparatus for monitoring a vehicle camera system. The camera system comprises at least one camera to capture images of a field of view at a side of the vehicle and a display unit for visualizing the captured images to a driver of the vehicle. The apparatus comprises a control unit that is adapted to control the display unit to display a graphical indicator. The displayed graphical indicator changes sequentially in a default way to allow the driver to visually detect a malfunctioning of the vehicle camera system based on a deviation from the default way of the sequentially changing graphical indicator. The change in the graphical indicator may be independent from the captured images so that even at standstill of the vehicle the graphical indicator should change—at least as long as the system operates correctly. However, when the graphical indicator is delayed or is even in a frozen state, the driver may promptly infer that the system does not operate correctly.

Optionally, the graphical indicator changes according to a predetermined characteristic by varying at least one of the following quantities: an intensity, a shape or form, a color of a graphical element, a motion of indicator elements. For example, the graphical indicator may be adapted to change with a periodicity of less than 5 s, less than 3 s or less 1 s or any other period that be easily recognized by a driver within a short period by a single glance.

The vehicle camera system may comprise a processing unit to process the captured images of the at least one camera and to display the processed images on the display unit. The control unit may further be adapted to let the processing unit to overlay the graphical indicator on the display unit while displaying the captured images. In particular, the control unit may or may not be part or a module of the processing unit. Hence, the processing unit may or may not be a separate unit.

Optionally, the apparatus comprises a light source in the field of view of the camera adapted to change its light in a default way and the control unit is adapted to process captured images of the camera and to display the changing light source on the display unit as the graphical indicator. In this case, the control unit may be the processing unit. The light source should be mounted accordingly and may include one or more LEDs arranged, for example, on a glass or a lens of the camera and change(s) its/their light, color, etc.

According to further embodiments, the vehicle may comprise any kind of a light source in the field of view of the camera and this light source is controlled by a light control system to generate a periodic varying light. Accordingly, the control unit may be adapted to vary, as the default way, the graphical indicator sequentially based on the variation of the light source controlled by the light control system. The light source may be a turn light or a light electrically connected to one of the turn lights.

Optionally, the control unit is adapted to vary the graphical indicator periodically with a same frequency, but with a predetermined time delay compared to variations of the light source (as controlled by the light source control unit), wherein the time delay is adjustable between zero and one period of the sequentially variation of the light source. For example, the light source and the graphical indicator may alternately or simultaneously blink. In addition, any phase shift between both periodic signals is possible.

Optionally, the control unit is adapted to display the graphical indicator on the display unit in a close proximity of the displayed light source (e.g. at least partially encircling or adjacent to one another).

The light control system may be adapted to periodically vary the light of the light source with a default rate. Then, the control unit may be adapted to enable the following functions: (i) to determine a rate of change for the light source in the captured image; (ii) to detect a deviation in the determined rate of change from the default rate of change; and (iii) to issue a warning if deviations are detected.

Embodiments of the present invention relate also to a vehicle camera system comprising at least one camera, a display unit for displaying images captured by the at least one camera and an apparatus as described before for enabling a driver of the vehicle to visual detect a malfunctioning of the vehicle camera system.

Optionally, the vehicle camera system comprises a light control unit and a light source controlled by the light control unit, wherein the light control unit is adapted to modify an intensity of the light source dependently on the environment condition.

The light control unit may be a turn indicator control system of the vehicle and the light source may be at least one of the turn indicators of the vehicle.

Embodiments of the present invention relate also to a vehicle with a vehicle camera system as defined before, wherein the control unit, the camera, the display unit and the light control system may be connected to the vehicle communication bus.

Embodiments of the present invention relate also to a method for monitoring a vehicle camera system comprising at least one camera, a display unit and a processing unit, the vehicle camera system being adapted to visualize an image of a side of the vehicle on the display unit. The method comprises: generating or capturing a graphical indicator or an image changing in a default way; and showing the sequentially changing graphical indicator or the captured image on the display unit to allow a driver of the vehicle to detect a malfunctioning of the vehicle camera system based on a deviation of the displayed change in the graphical indicator or the image from the default way.

This method may also be implemented in software or a computer program product and the order of steps may not be important to achieve the desired effect. Embodiments of the present invention can, in particular, be in any kind of vehicle control unit (ECU) or implemented by software or a software module in an ECU. Therefore, embodiment relate also to a computer program having a program code for performing the method, when the computer program is executed on a processor.

Within the present invention the graphical indicator should be construed broadly. In particular, also the depiction of a light source may be a graphical indicator. A separate light source (e.g. an LED or any other additional light source) may be controllable based on the same control signal as the turning light. They may have the same frequency, but they may or may not be synchronized.

The present invention solves at least some of the above-mentioned problems by implementing a control unit which is configured to control the display of the vehicle camera system to show a graphical indicator that changes in a predefined manner so that the driver having a quick look on the display will immediately recognize whether the system is frozen or malfunctioning, in which case the graphical indicator will not change as expected.

The graphical indicator can, in particular, overlay the used display of the vehicle camera system so that the frozen state of the camera system would also result in a freezing of the graphical indicator which can immediately be detected by the driver.

There are many possibilities of implementing a changing graphical indicator. For example, a particular moving indicator can be used (for example a brighter spot that moves around a circle or along a line or, equivalently, a darker spot that performs a particular movement along the display).

Some examples of the systems and/or methods will be described in the following by way of examples only, and with respect to the accompanying figures.

DETAILED DESCRIPTION

Figure 1:
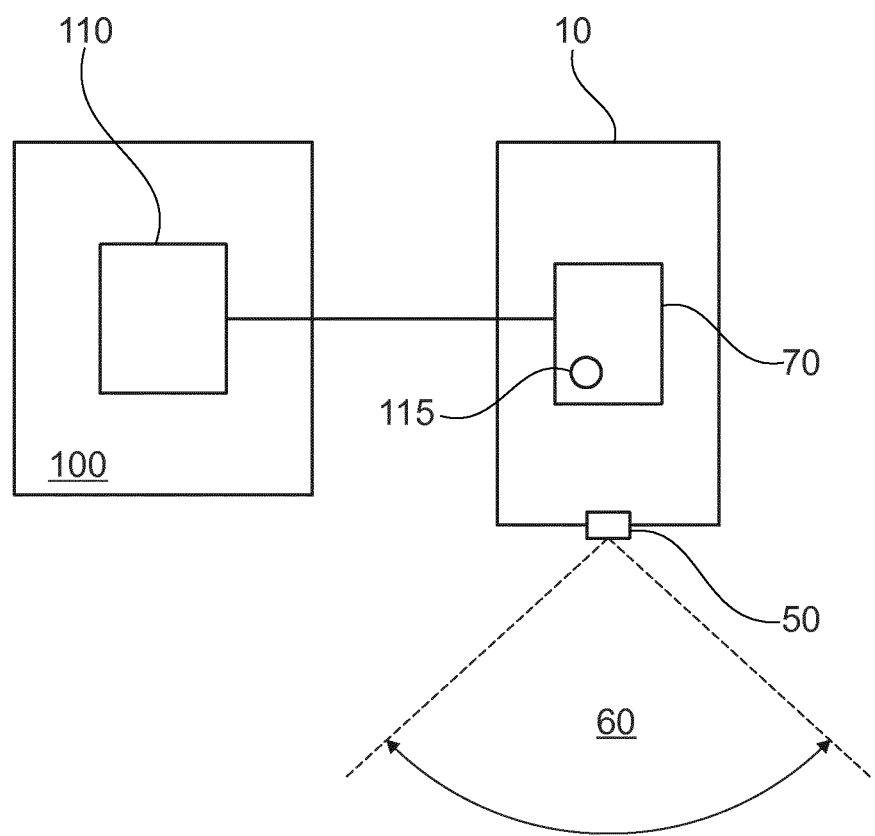
FIG. 1 depicts an apparatus for monitoring a vehicle camera system according to an embodiment of the present invention.

FIG. 1 depicts an apparatus 100 which is suitable for monitoring a vehicle camera system 10. The vehicle camera system 10 comprises at least one camera 50 to capture at least one image of a field of view 60 at a side of the vehicle and a display unit 70 for visualizing the captured image to a driver of the vehicle. The apparatus includes a control unit 110 to control the display unit 70 to display a graphical indicator 115. The graphical indicator 115 is adapted to sequentially change to allow the driver to visually verify a correct functioning of the vehicle camera system 10. The change in the graphical indicator 115 may be independent of the captured image of the vehicle 40. However, it may also be possible that a changing object may be present in the field of view 60 of the camera 50, wherein the object changes in predefined way to enable an identification of a malfunctioning based on an unexpected deviation detected in the change of the object.

Therefore, embodiments of the present invention combine the camera system (see FIG. 6) with a graphical indicator 115 to detect a possibly frozen image of the display 70 in such a way that it is easily recognizable for the driver.

Figure 2:
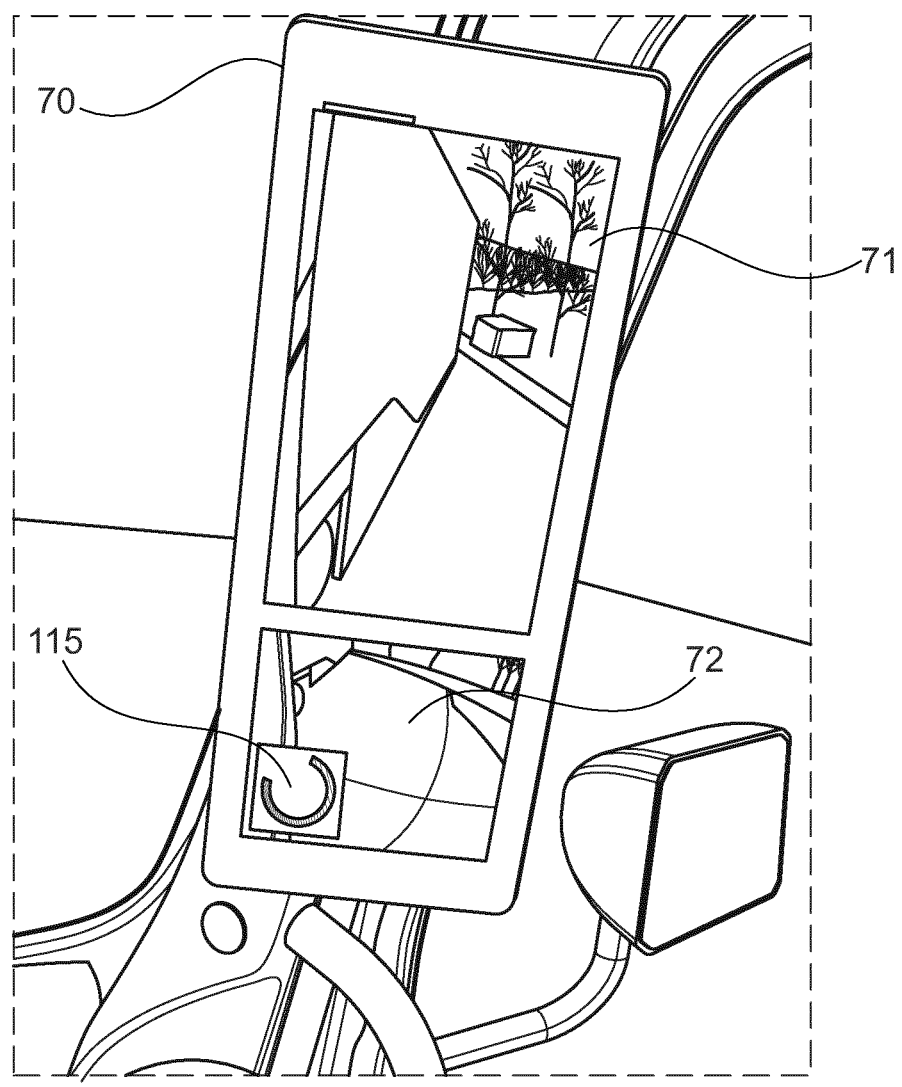
FIG. 2 depicts an embodiment of a sequential changing indication overlayed on a depicted image.

FIG. 2 depicts an exemplary embodiment of this combination. It includes a display 70 with a first display element 71 and a second display element 72, which may be part of one unit or represent separate units. For example, the first display element 71 depicts a narrow-angle view and the second display element 72 depicts a wide-angle view. Both views may be captured by one or by separate cameras. The second display element 72 shows exemplary the graphical indicator 115, which is overlaid over the depicted camera image and is sequentially updated. The position of the graphical indicator 115 can be chosen freely. For example, it may be positioned at an area of the display where part of the vehicle is shown to avoid that any objects of interest could be hidden by the graphical indicator 115. In further embodiments, the graphical indicator 115 may also be displayed in the first display element 71 or multiple graphical indicators may be depicted to ensure that any frozen image can simply be detected by inspecting the graphical indicator 115.

Although camera-display surround monitoring systems are able to execute several self-monitoring functionality on its components, this may not ensure that the finally depicted image on the display 70 is really up-to-date (e.g. it may be frozen for other reasons). In the attempt to cover any failure, embodiments implement a plausibility check finally performed by the driver based on the graphical indicator 115. For this, the cross-check of the driver may be based on certain basic assumptions. These assumptions include: a well-defined content of the picture (graphical indicator 115), a changing light/color in the image, it may always be on the same place, it always changes according to the same sequence. It will be appreciated that these assumptions simplify the detection of malfunctions by the driver, but they do not need necessarily be implemented. For example, the graphical indicator 115 may also dynamically be placed at a position where it does not obstruct any object, or dependent on the environment condition the graphical indicator 115 may be different. However, the form, size and color of the graphical indicator 115 should be such that the driver perceives it by a single glance.

In the embodiment of FIG. 2 the sequential changing indicator 115 represents a revolving ring of variable brightness. When it moves with a recognizable speed, the circulating object can easily verified by the driver. For example, the frequency of the moving ring can be selected such that even with a quick glance the driver can detect any frozen state. The frequency (circulations per second) may be e.g. between 0.1 Hz and 4 Hz or between 0.5 to 2 Hz. Since this frequency is preset (as a default value) the driver will also realize deviations from it and thus can detect any retardation as a precursor of a frozen state. As a result, the driver is able to detect malfunctioning of the camera system by a single visual inspection.

As shown in FIG. 2, the graphical indicator 115 may be an artificial graphical object whose changes with time allow the driver to detect any malfunctioning of the surveillance system 10. However, it is also possible to use as graphical indicator 115 a captured image of a light source such as the turn light of the vehicle which likewise allows the driver to detect any malfunctioning of the camera system.

Figure 3:
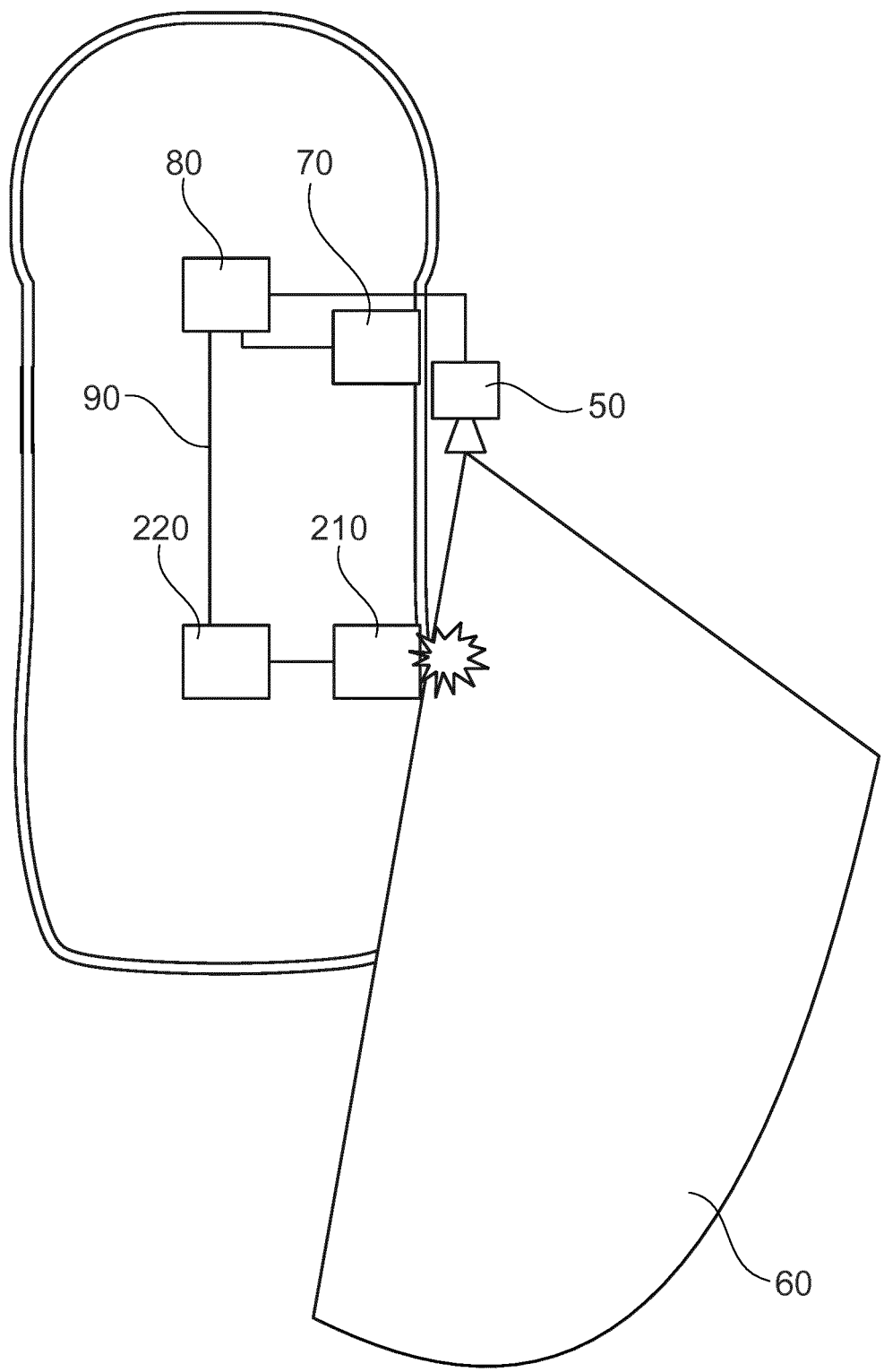
FIG. 3 depicts a system architecture wherein a light source is mounted in the field of view of the camera of the camera-display system.
Figure 7:
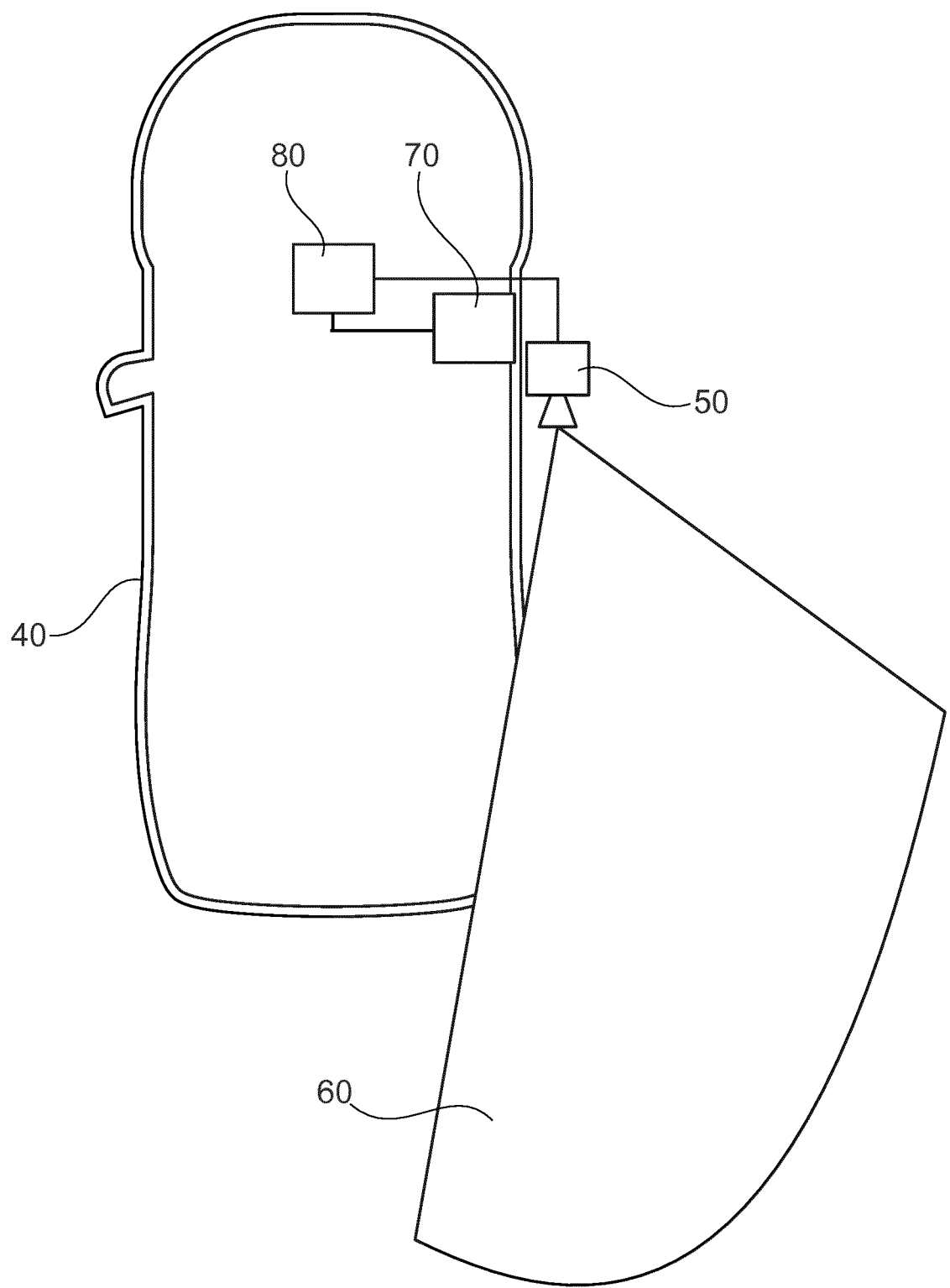
FIG. 7 depicts an example of a conventional vehicle camera system.

FIG. 3 depicts an embodiment of the present invention, wherein the camera system 10 with the processing unit 80, the display 70 and the camera 50 (as in the conventional system of FIG. 7) is combined with such a light source 210. The light source 210 is mounted in the field of view of the camera 50 of the camera-display system 10 and is controlled by a light control unit 220.

In this embodiment the communication bus 90 of the vehicle connects the processing unit 80 with a light control unit 220 so that the processing unit 80 may control indirectly the light source 210 or at least is able to obtain information about the control of the light source 210. In addition, the processing unit 80 controls the display unit 70 to depict at least images captured by the camera 50.

The light source 210 may be a turn indicator of the vehicle or may be another light source (in addition to the turn light) that is controlled such as the turn indicator. According to the present invention, the camera 50 and/or the light source 210 are mounted at positions such that the light source 210 is captured by the camera 50. It is likewise possible that the light source 210 is mounted directly on a lens or a glass plate or even inside the camera 50. As long as the captured images of the camera 50 will capture also a picture of the light source 210, the position of the light source 210 can be anywhere.

As a result, the display 70 will display the light source 210. Now, in case the driver intends to make a turn or a lane change, the driver may first wish to ensure that no other vehicle or object is in the adjacent lane where the driver wants to turn. Therefore, the driver will inspect the display 70 and will see the flashing light source 210 captured by the camera 50 and from the flashing light the driver can verify that the camera system is operating correctly.

Figure 4:
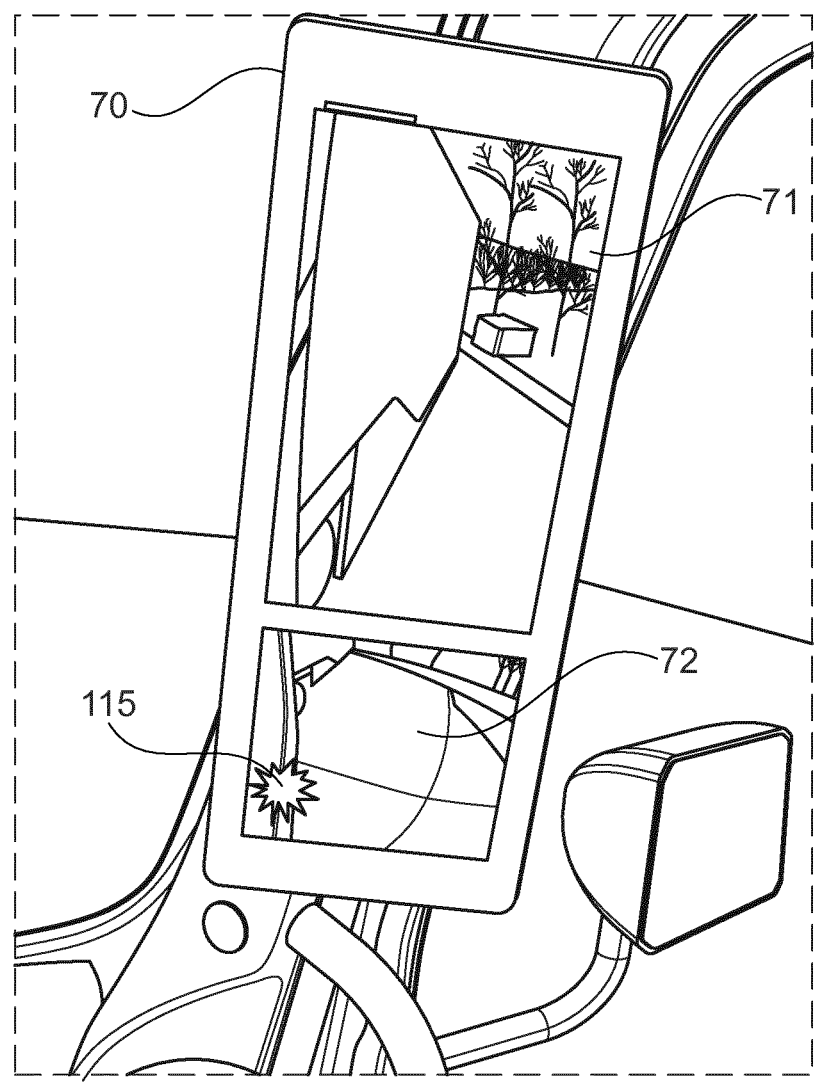
FIG. 4 depicts a combined view as seen by the driver with the captured image of the environment together with the sequential changing indicator including an illuminating light source at the vehicle.

FIG. 4 depicts the view on the display 70 for the system of FIG. 3 as seen by the driver of an exemplary commercial vehicle. In this embodiment the image of the light source 210 in the lower left corner of the second display element 72 represents the graphical indicator 115. The second display element 72 depicts again an enlarged view on the area very close to the vehicle (narrow-angle view), whereas the first display element 71 depicts a view that also captures further distant objects behind the vehicle. It is of advantage to depict the light source 210 in the narrow-angle view, because it appears enlarged in this display element 72. If the first and second display elements 71, 72 are controlled by one processing unit 80, a single graphical indicator 115 may be sufficient to detect a malfunctioning the processing unit 80. Otherwise, also multiple graphical indicators 115 may be used to test also other display elements (such as the first display element 71).

Hence, in this embodiment the processing unit 80 is the control unit 110 of FIG. 1, because by simply displaying the captured image, the changing light source 210 will be depicted as a graphical indicator 115.

As described with FIG. 3 the light source 210 is placed on the vehicle body at a position where the camera 50 is able to capture the light. The captured image is transferred to and processed by the processing unit 80 and finally displayed as graphical indicator 115 to the driver. Since the light source 210 will change (blink) in a default way that is known to the driver, any deviation from an expected change (e.g. a blinking frequency) allows the driver to detect a failure or malfunctioning of at least one component of the system.

Figure 5:
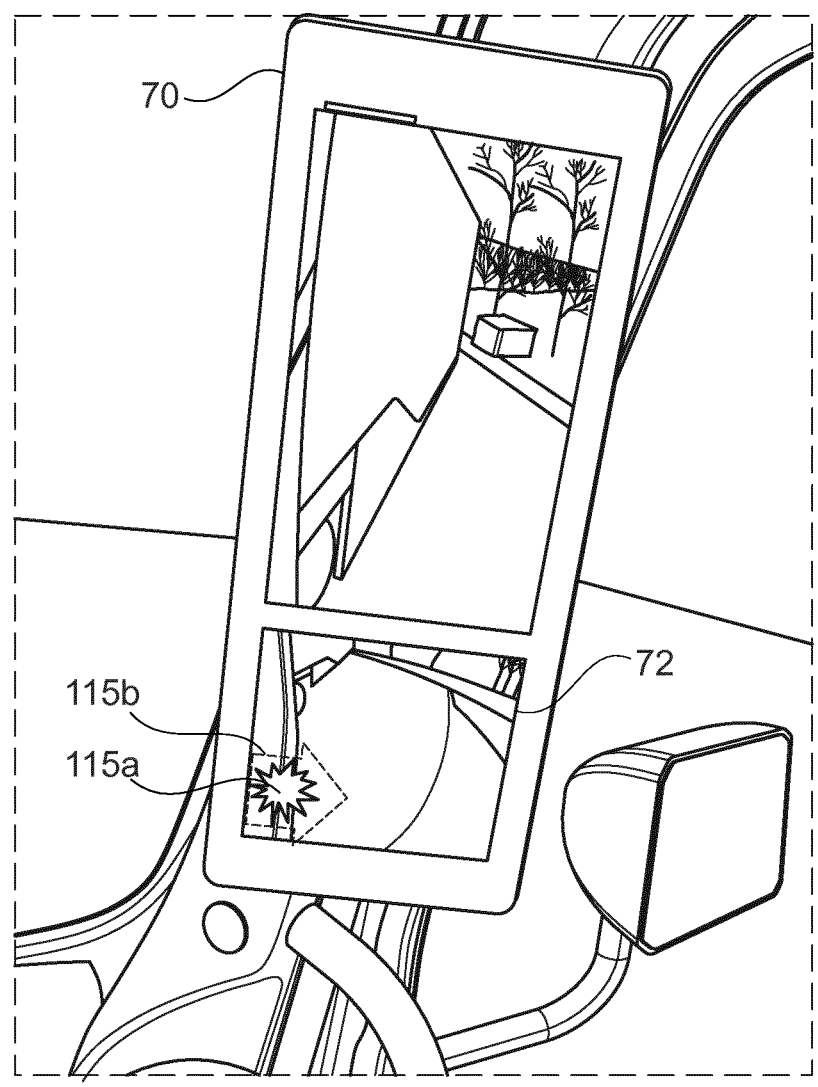
FIG. 5 depicts an embodiment wherein the graphical overlay is combined with a light source.

FIG. 5 illustrates yet another embodiment of the present invention, wherein a separate graphical indicator 115 is combined with a light source 210. Therefore, this embodiment shows two independent indicators to ensure a correct functioning: a graphical overlay 115a as descripted in FIG. 2 as graphical indicator 115 combined with the displayed light source 115b as descripted with FIG. 4. The graphical overlay 115a represents, for example, a frame circulating at least partially the depicted light source 115b (or is a bounding box around the light source 210) and may be graphically overlaid on the depicted image. The driver may simply recognize the graphical overlay 115a when it is formed as a blinking frame 115b for the depicted light source.

According to embodiments, the graphical overlay 115a is controlled with the same sequence or frequency as the light source 210. It is likewise possible, that a phase between both periodic signals is shifted so that the graphical overlay 115a and the displayed light source 115b blink alternately. In principle, any timing shift between the overlay 115b and the light sequence 115a can be implemented in embodiments. However, since both indicators 115a, 115b are in general generated differently they can be displayed in a way that simplifies the detection of the malfunctioning by the driver.

Since the graphical overlay 115a is generated independently of the captured image, the control unit 110 may be implemented as a specific module (e.g. in software) in the processing unit 80. Therefore, the control unit 110 may or may not be part or a module of the processing unit 80. If the control unit 110 is a separate unit, it may be adapted to let the processing unit 80 to overlay the graphical indicator 115a on the display unit 70 while displaying the captured images.

Depending on the illumination of the graphical overlay 115a (brightness, contrast change, bounding box size, color change, etc. on the area where the light 115b is located), the driver is forced to focus during a cross-check on the overlay sequence 115a and the light sequence 115b. In this way not only a frozen image, but also a possible delay, as a further failure mode, can be recognized easily.

Further embodiments relate to a redundant monitoring of the camera display system. For example, the light control unit 220 may be adapted to periodically vary the light of the light source 210 with a default rate (e.g. with a predetermined frequency). The control unit 110 or the processing unit 80 may determine a rate of change for the light source in the captured image. If the system operates correctly, both rates should coincide. If not, a system failure may have occurred. Therefore, the control unit 110 or the processing unit 80 may be adapted to detect a deviation in the determined rate of changed and the default rate of change. If such deviation is detected, a warning may be issued (e.g. a visible or acoustic signal recognizable by the driver can be issued).

Therefore, according to further embodiments, two separate validations can be implemented: a visual system, where the drive can visually detect a malfunctioning (e.g. by a frozen/delayed state), and an internal monitoring system, where the system compares the changing light source in the captured image with a default (preset) rate of change. In addition, embodiments rely on two different detection possibilities: an artificial graphical indicator 115a and a captured light source 115b with a changing light.

These systems can be separated or packaged into one system. In the latter case, the independent operation should be ensured so that a same cause cannot imply the malfunctioning of both systems.

In particular, embodiments may be implemented on any vehicle with an illumination system that is suitable for such a purpose (e.g. providing an independently changing light). For example, the turn indicator is suitable, because:
- it operates with a predefined illumination sequence in case when surrounding supervision is needed (lane change and/or turning);
- it is mounted on the vehicle body, vehicle design can ensure that it is visible in a camera field of view 60;
- the driver is aware of its operation (activates the turn indicator) and frequency;
- it is a redundant system compared to the camera-display system 10.

In this way one possible realisation of the invention is the usage of the turn indicator control system as the light control system.

Figure 6:
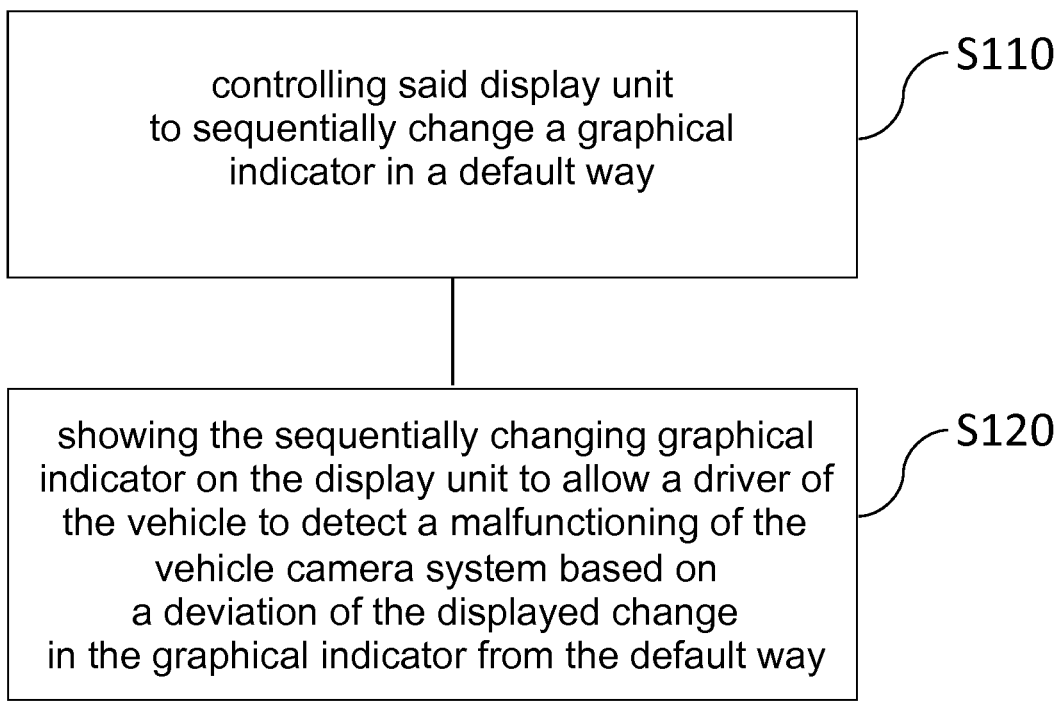
FIG. 6 depicts a flow chart for a method for monitoring a vehicle camera system according to further embodiments of the present invention.

FIG. 6 depicts a flow diagram of a method for monitoring a vehicle camera system. The method comprises the steps of:
- generating or capturing S110 a graphical indicator 115 changing in a default way; and
- showing S120 the changing graphical indicator 115 on the display unit 70 to allow a driver of the vehicle to detect a malfunctioning of the vehicle camera system 10 based on a deviation of the displayed change in the graphical indicator 115 from the default way.

It will be appreciated that any function described before in conjunction with the apparatus/vehicle camera system may be implemented as additional method step in this method.

Furthermore, this method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the a computer or processor.

Embodiments of the present invention can be summarized as follows:

One embodiment relates to a camera and display system 10 of a vehicle containing at least one camera 50, one display 70 and processing unit 80, 110, wherein the surrounding of the vehicle is visualized for the driver and predefined sequential change of an indication 115 is shown on the display 70.

Another embodiment relates to a system, wherein additionally the sequential indication 115 is the variation of the intensity and/or shape and/or color of the indication.

Another embodiment relates to a system, wherein additionally the sequential indication has constant sequence and possible to learn by the driver.

Another embodiment relates to a system, wherein additionally the sequential indication 115 is given by graphical overlay on the display controlled by the processing unit 80, 110.

Another embodiment relates to a system, wherein additionally the sequential indication 115 is given by light source 210, connected to a light control unit 220, placed in the field of view 60 of the camera 50 in order that illumination of the light source 210 is perceptible by the camera 50.

Another embodiment relates to a system, wherein additionally the camera and display system and the light control system 220 are connected.

Another embodiment relates to a system, wherein additionally the connection of the camera and display system and the light control system 220 is realized by the vehicle communication bus 90.

Another embodiment relates to a system, wherein additionally the indication sequence of the graphical overlay 115 and indication sequence of the light source 210 are the same.

Another embodiment relates to a system, wherein additionally the indication sequence of the graphical overlay 115 is delayed compared to indication sequence of the light source 210 by time shift between zero and the period of the indication sequence.

Another embodiment relates to a system, wherein additionally the graphical overlay 115 is in a close proximity of the appearance of the light source 210 on the display.

Another embodiment relates to a system, wherein additionally the illumination intensity of the light source 210 is adapted to the environmental conditions.

Another embodiment relates to a system, wherein additionally the light control unit 220 is the turn indicator control system of the vehicle, and the light source 210 is at least one of the turn indicator of the vehicle.

Another embodiment relates to a method of camera and display system of a vehicle containing at least one camera 50, one display 70 and processing unit 80, 110 wherein the surrounding of the vehicle is visualized for the driver, wherein additionally a predefined sequential change of an indication 115 is shown on the display 70.

Another embodiment relates to a method, wherein additionally the predefined sequential change of the indication is applied on a light source 210, controlled by light control unit 220 and placed in the field of view of the camera 50 in order that illumination of the light source is perceptible by the camera 50.

Another embodiment relates to a method, wherein additionally the predefined sequential change of the illumination of the light source 210 is evaluated by the processing unit 80, 110 based on the camera perception and in case of deviation between the predefined sequence and evaluated sequence, a failure indication is issued.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

THE LIST OF REFERENCE SIGNS IS AS FOLLOWS

40 vehicle
50 at least one camera
60 camera field of view
70 display unit
71, 72 display elements
80 processing unit
90 vehicle bus
110 control unit
115, 115*a* graphical indicator
115*b* displayed light source as graphical indicator

The invention claimed is:

1. An apparatus for monitoring a vehicle camera system, comprising:
   a display unit to display a graphical indicator, wherein the camera system includes at least one camera to capture images of a field of view at a side of the vehicle and the display unit for visualizing the captured images to a driver of a vehicle; and
   a light source, controlled by a light control system, in the field of view adapted to change its light in a default way, and wherein a processing unit processes captured images of the camera and controls the display of the changing light source on the display unit as the graphical indicator;
   wherein the displayed graphical indicator changes sequentially in a default way to allow the driver to visually detect a malfunctioning of the vehicle camera system based on a deviation from the default way of the sequentially changing graphical indicator.

2. The apparatus of claim 1, wherein the graphical indicator changes according to a predetermined characteristic by varying at least one of the following quantities: an intensity, a shape, a form, a color of a graphical element, and/or a motion of indicator elements.

3. The apparatus of claim 1, wherein the vehicle camera system further comprises:
   a processing unit to process the captured images of the at least one camera and to display the processed images on the display unit, wherein the processing unit overlays the graphical indicator on the display unit while displaying the captured images.

4. An apparatus for monitoring a vehicle camera system, comprising:
   a display unit to display a graphical indicator, wherein the camera system includes at least one camera to capture images of a field of view at a side of the vehicle and the display unit for visualizing the captured images to a driver of a vehicle;
   wherein the displayed graphical indicator changes sequentially in a default way to allow the driver to visually detect a malfunctioning of the vehicle camera system based on a deviation from the default way of the sequentially changing graphical indicator, and
   wherein the vehicle includes a light source in the field of view controlled by a light control system to generate a periodic varying light, and wherein the processing unit is adapted to vary, as the default way, the graphical indicator sequentially based on the variation of the light source controlled by the light control system.

5. The apparatus of claim 4, wherein the processing unit is adapted to vary the graphical indicator periodically with a same frequency, but with a predetermined time delay compared to variations of the light source, and wherein the time delay is adjustable between zero and one period of the sequentially variation of the light source.

6. The apparatus of claim 1, wherein the processing unit is adapted to display the graphical indicator on the display unit in a close proximity of the displayed light source.

7. The apparatus of claim 1, wherein the processing unit is adapted to periodically vary the light of the light source with a default rate, and wherein the processing unit is adapted to perform the following:
   (i) determining a rate of change for the light source in the captured image;
   (ii) detecting a deviation in the determined rate of change from the default rate of change; and
   (iii) issuing a warning if the deviation is detected.

8. A vehicle camera system, comprising:
   at least one camera;
   a display unit to display images captured by the at least one camera; and
   an apparatus for allowing a driver of a vehicle to detect a malfunctioning of the vehicle camera system, by performing the following:
      generating or capturing a graphical indicator or an image changing in a default way, wherein the vehicle camera system includes the at least one camera, the display unit and a processing unit, and wherein the vehicle camera system is adapted to visualize an image of a side of a vehicle on the display unit; and
      showing the changing graphical indicator or the captured image on the display unit to allow a driver of the vehicle to detect a malfunctioning of the vehicle camera system based on a deviation of the displayed change in the graphical indicator or the captured image from the default way;

wherein the vehicle includes a light source in the field of view controlled by a light control system to generate a periodic varying light, and wherein the processing unit is adapted to vary, as the default way, the graphical indicator sequentially based on the variation of the light source controlled by the light control system; and.

9. The camera system of claim 8,
wherein an intensity of the light source is modified dependent on the environment condition.

10. The camera system of claim 8, wherein the light control system includes a turn indicator control system of the vehicle.

11. A vehicle with a vehicle communication bus, comprising:
a vehicle camera system, including:
at least one camera;
a display unit to display images captured by the at least one camera; and
an apparatus for allowing a driver of a vehicle to detect a malfunctioning of the vehicle camera system, by performing the following:
generating or capturing a graphical indicator or an image changing in a default way, wherein the vehicle camera system includes the at least one camera, the display unit and a processing unit, and wherein the vehicle camera system is adapted to visualize an image of a side of a vehicle on the display unit; and
showing the changing graphical indicator or the captured image on the display unit to allow a driver of the vehicle to detect a malfunctioning of the vehicle camera system based on a deviation of the displayed change in the graphical indicator or the captured image from the default way;
wherein the vehicle includes a light source in the field of view controlled by a light control system to generate a periodic varying light, and wherein the processing unit is adapted to vary, as the default way, the graphical indicator sequentially based on the variation of the light source controlled by the light control system; and
a vehicle communication bus that connects the camera, the display unit the light control system, and a processing unit for processing captured images of the camera.

12. A method for monitoring a vehicle camera system, the method comprising:
generating or capturing a graphical indicator or an image changing in a default way, wherein the vehicle camera system includes at least one camera, a display unit and a processing unit, and wherein the vehicle camera system is adapted to visualize an image of a side of a vehicle on the display unit; and
showing the changing graphical indicator or the captured image on the display unit to allow a driver of the vehicle to detect a malfunctioning of the vehicle camera system based on a deviation of the displayed change in the graphical indicator or the captured image from the default way;
wherein the vehicle includes a light source in the field of view controlled by a light control system to generate a periodic varying light, and wherein the processing unit is adapted to vary, as the default way, the graphical indicator sequentially based on the variation of the light source controlled by the light control system.

13. A non-transitory computer readable medium having a computer program, which is executable by a processor, comprising:
a program code arrangement having program code for monitoring a vehicle camera system, by performing the following:
generating or capturing a graphical indicator or an image changing in a default way, wherein the vehicle camera system includes at least one camera, a display unit and a processing unit, and wherein the vehicle camera system is adapted to visualize an image of a side of a vehicle on the display unit; and
showing the changing graphical indicator or the captured image on the display unit to allow a driver of the vehicle to detect a malfunctioning of the vehicle camera system based on a deviation of the displayed change in the graphical indicator or the captured image from the default way;
wherein the vehicle includes a light source in the field of view controlled by a light control system to generate a periodic varying light, and wherein the processing unit is adapted to vary, as the default way, the graphical indicator sequentially based on the variation of the light source controlled by the light control system.

* * * * *